UNITED STATES PATENT OFFICE.

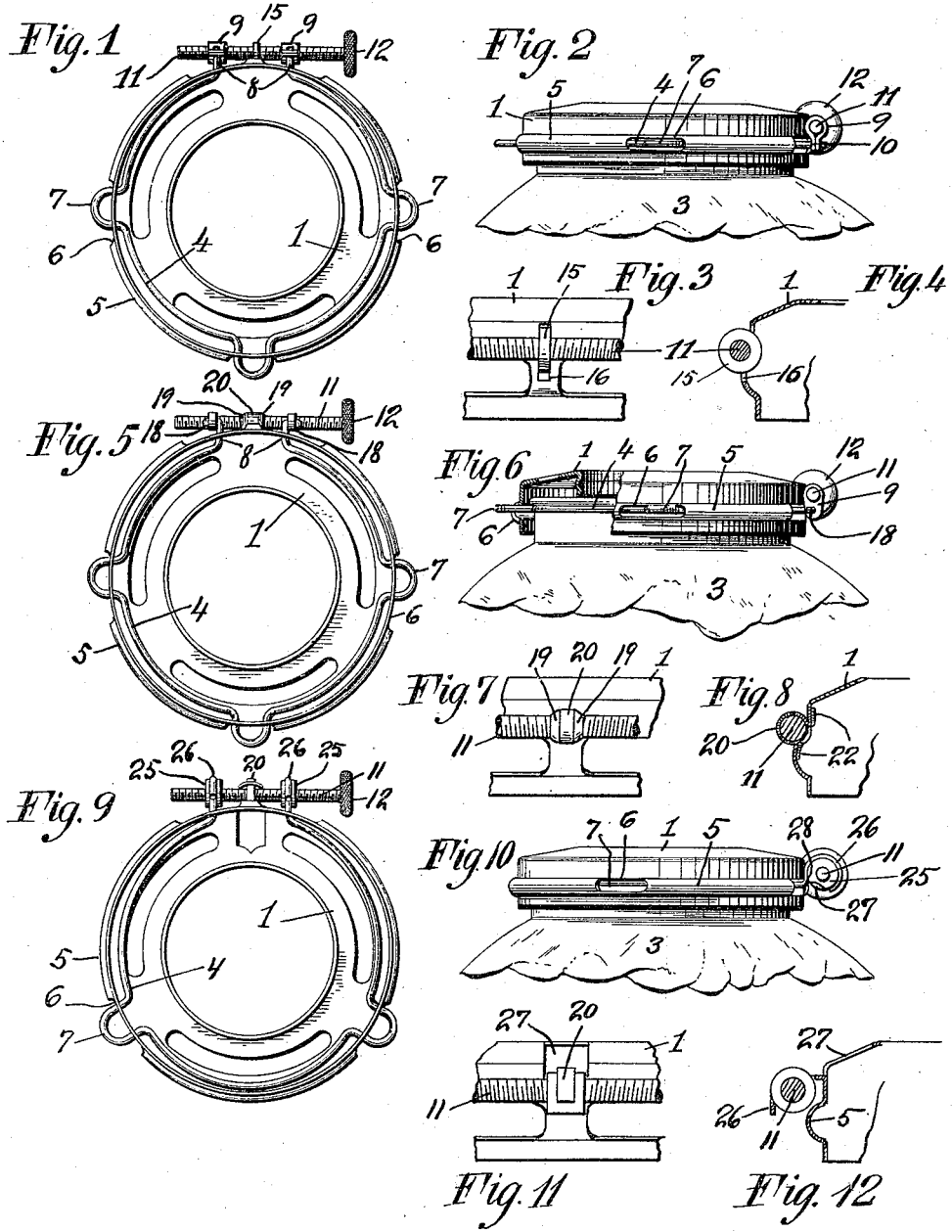

HARVEY HUBBELL, OF BRIDGEPORT, CONNECTICUT.

SHADE-HOLDER.

1,135,020.  Specification of Letters Patent.  Patented Apr. 13, 1915.

Application filed August 23, 1912. Serial No. 716,572.

*To all whom it may concern:*

Be it known that I, HARVEY HUBBELL, a citizen of the United States, residing at Bridgeport, in the county of Fairfield and State of Connecticut, have invented certain new and useful Improvements in Shade-Holders, of which the following is a full, clear, and exact specification.

This invention relates to shade holders wherein the rim of the shade is gripped by a contractible ring which is itself carried in a support at separated points of contact in such manner as to permit expansion and contraction of the ring for various diameters of shades without disengaging the ring from the support.

The present invention has for its object to provide in combination with a screw or cam means for contracting the ring, means for preventing undue movement of the ring in the support or holder, without affecting its resiliency or interfering with its free contraction and expansion.

In the accompanying drawing, Figures 1, 2, 3 and 4 show various details of one form of the invention, Fig. 1 being a bottom plan view, Fig. 2 a side elevation, and Figs. 3 and 4 enlarged details of the manner of effecting the engagement between the ring and the support to prevent rotation and displacement of the ring; Figs. 5, 6, 7 and 8 represent corresponding views of a modification; and Figs. 9, 10, 11 and 12 show corresponding views of another modification.

Referring to Figs. 1 to 4, 1 represents the support which is provided with suitable means for attachment to a lamp fixture, and 3 represents the shade, reflector or other device which is to be supported. 4 represents a resilient, normally expanding clamping ring, which is contained when fully expanded within the bead 5 of the support 1. The support, preferably at the beaded portion, is provided with slots 6, through which loops or bent portions 7 of the ring project, and also the ends 8, 8 of the ring. The ends 8, 8 pass through the nuts 9, 9, being headed to loosely engage therewith as at 10 so as to permit a slight pivotal movement of the nuts 9. 11 represents the contracting screw having a thumb piece 12, and provided with opposite threads so that the ends of the ring are simultaneously contracted and expanded according to the direction and rotation of the screw. The intermediate portion of the screw is provided with a collar 15 which engages in a slot 16 formed in the shell, to hold the screw and thereby the ring 4 against displacement, so that even in case the ring be very tightly contracted it will not disengage the loops 11 from the slots 6. At the same time, it is possible to avoid a considerable projection of the loops 7, which is objectionable in the shade holder for various reasons, such as clearance, liability of entanglement with other objects, breakage, etc. By holding the screw 11 against longitudinal displacement by means of the collar 15 rotating in the slot 16 of the support, the ring is thereby centered and held within a predetermined position. At the same time, by reason of the pivoted nuts 9 which extend upwardly, the screw 11 is brought close to the side of the support, avoiding objectionable projections.

In Figs. 5 to 8, the construction of the ring and support is substantially the same, the difference in construction being in the mounting of the screw. In this form, particularly in Figs. 6, 7 and 8, the ends of the ring are hooked, as at 18, through perforations in the base of the nuts 9, the screw 11 being provided with spaced collars 19 which engage with a loop 20 and carried by the support 1, the loop 20 being a small strip having its ends passed through perforations and bent under the support as at 22. An advantage of this form of construction is that the screw 11 is brought close to the side of the body 1, as seen from Fig. 8, only a small portion of the screw overhanging the bead 5. It will also be seen that the nuts 9, being loosely engaged with the hooks 18, have sufficient play to prevent binding of the threads in contracting and expanding the ring.

In Figs. 9 to 12, the clamping ring is similarly mounted, it being seen that the nuts 25 are channeled to receive the ends 26 of the clamping ring 4, the nuts being sufficiently loose to allow the necessary movement to prevent binding and, at the same time, held against rotation by small lugs or indentations 27 forced into the space between the free end of the wire 4 and the bend 28. The collar 20 on the screw 11 is carried by a slotted projecting piece 26 which is stamped out of the body on the support and bent around as shown at 27, the inner surface of the collar 20 bearing against the bead 5, thereby holding the screw against displacement.

In each of the foregoing forms exemplifying the invention, it will be seen that the contractible ring, and thereby the shade, is held against displacement and centered properly in the holder without liability of accidental disengagement with consequent release of the shade, or of displacement.

Various modifications and changes in the specific arrangements herein shown may be made without departing from the scope of the invention.

Having thus described my invention, I declare that what I claim as new and desire to secure by Letters Patent is:

1. A shade holder comprising a body portion having a central aperture to receive a lamp socket, a slotted flange, a contractible ring within said flange having its ends and a plurality of intermediate portions loosely supported in said slots, and a screw connecting the ends of said ring, said screw interlocking with the body portion between the ends of said ring to limit movement thereof relatively to the body portion.

2. A shade holder comprising a body portion having a slotted flange, a contractible ring within said flange having its ends and a plurality of intermediate portions loosely supported in said slots, a screw connecting the ends of said ring, and a shoulder on the screw intermediate the ends having engagement with the body portion to prevent longitudinal displacement of the screw.

3. A shade holder comprising a body portion having a slotted flange, a contractible ring within said flange having its ends and a plurality of intermediate portions loosely supported in said slots, nuts linked to the respective ends of the ring, and a screw engaging said nuts and having an intermediate interlocking engagement with the body portion.

In testimony whereof I affix my signature, in presence of two witnesses.

HARVEY HUBBELL.

Witnesses:
C. V. EDWARDS,
K. G. LE ARD.

Copies of this patent may be obtained for five cents each, by addressing the "Commissioner of Patents, Washington, D. C."